United States Patent [19]

Miyashita

[11] 3,836,098

[45] Sept. 17, 1974

[54] VIBRATION ABSORBING DEVICE FOR ROTORCRAFT

[75] Inventor: Junichi Miyashita, Niwa, Japan

[73] Assignee: Kawasaki Jukogyo Kabushiki Kaisha, Ikuta-ku, Kobe-shi, Hyogo-ken, Japan

[22] Filed: Mar. 3, 1972

[21] Appl. No.: 231,477

[30] Foreign Application Priority Data

Mar. 8, 1971  Japan.............................. 46-12309

[52] U.S. Cl. .......... 244/17.27, 188/1 B, 248/358 R, 416/500
[51] Int. Cl. ........................................... B64c 27/04
[58] Field of Search........... 244/17.25, 17.27, 17.11, 244/17.23; 188/1 B; 248/358 R; 416/500

[56] References Cited
UNITED STATES PATENTS

| | | | |
|---|---|---|---|
| 2,611,557 | 9/1952 | Donovan | 244/17.11 UX |
| 3,477,665 | 11/1969 | Legrand | 244/17.27 |
| 3,514,054 | 5/1970 | Mard et al. | 244/17.27 |
| 3,617,020 | 11/1971 | Gerstine et al. | 244/17.27 |
| 3,638,885 | 2/1972 | Reed | 244/17.27 |

Primary Examiner—George E. A. Halvosa
Assistant Examiner—Paul E. Sauberer
Attorney, Agent, or Firm—Stevens, Davis, Miller & Mosher

[57] ABSTRACT

In a vibration absorbing device for rotorcraft, of the type having at least one vibration weight provided in the proximity of a structural member of the rotorcraft through which exciting forces are transmitted to the fuselage, and arranged in such a position and direction of vibration that a selected one of a plurality of forces and moment exciting forces may be offset by the force of inertia of said vibration weight, hydraulic means for imparting vibrations to said vibration weight and means for controlling said hydraulic means to impart desired vibrations to said vibration weight are provided.

3 Claims, 9 Drawing Figures

VIBRATION ABSORBING DEVICE FOR ROTORCRAFT

This invention relates to a vibration absorbing device, and more particularly to such vibration absorbing device which is effectively applied to rotorcraft such as helicopters, VTOLs and STOLs, though not limitative.

In general, rotorcraft such as helicopters are subjected to large vibrations during flight as compared with fixed-wing aircraft, and this is attributable mainly to the forces and moment exciting forces from a rotor. Namely, with $\Omega$ representing the rate of rotation of the rotor and n representing the number of blades, there are generated an exciting force having a frequency of $n\Omega$ (hereinafter referred to as $n\Omega$ vibration) and an exciting force having a frequency of an integer multiple of the rate of rotation (hereinafter referred to as $i\Omega$ vibration). The former is unavoidable with a rotor having n blades, and the latter results from the irregularities in shape, rigidity and mass distribution of the individual blades and is also of a negligible magnitude.

In the past, various proposals have been made to prevent these vibrations. Namely, in order to prevent the $n\Omega$ vibration, it has been proposed (a) to select the natural frequency of the fuselage, (b) to make a special device in the rotor supporting system or (c) to provide a vibration absorber consisting of a combination of a weight and members having a spring action. Further, in order to prevent the $i\Omega$ vibration, it has been proposed to make an adjustment of the tracking on the ground in addition to the above-mentioned methods for preventing the $n\Omega$ vibration.

However, the method (a) involves the problems that the prediction of the natural frequency of the actual fuselage in the design stage is difficult and that the design of a fuselage structure which will be satisfactory under varying load conditions is also difficult. The method (b) has the disadvantages that only one or two of all six types of exciting forces and moments can be dealt with and that the adjustment of tracking is effective only for an articulation type rotor and, in case of a non-articulation type rotor, a vibration moment corresponding to the difference of rigidities of the blades will generate if only the rotational planes are matched.

The method (c) aims to offset the exciting force by the inertia force of the weight and has the advantage that a large inertia force as would be obtainable from a large weight, can be obtained from a small weight when the weight is provided at a selected position of the fuselage. However, reduction of the weight is possible only by increasing the amplitude. For this reason, the resonance phenomenon is utilized, but a sufficiently large amplitude cannot be obtained due to a damping action and furthermore the use of only the portion of a large amplitude ratio is impossible since the frequency of the exciting force varies with the rate of rotation of the rotor. After all, a large weight becomes necessary. The additional disadvantages of these counter measures are that, since the resonance frequency is available only at one location, a highly efficient vibration preventing effect cannot be obtained for exciting forces of different frequencies and that there is not much freedom in the adjustment of the vibratory phase of the weight and further the wave-form is necessarily restricted to a sine wave.

The present invention has an object to provide a vibration absorbing device which is free of the above-described disadvantagps. disadvantages.

Namely, the vibration absorbing device according to the present invention is of the type in which at least one vibration weight is provided in the proximity of a structural member through which the exciting force is transmitted to the fuselage, and the location and the direction of vibration of said weight are so selected that the selected one of the six types of exciting forces and moments may be offset by the inertia force of said weight; which comprises hydraulic means for imparting vibrations to said vibration weight and means for controlling said hydraulic means to impart a predetermined vibration to said vibration weight.

The hydraulic means is controlled preferably by a servo valve of the type which is controlled by a signal from electrical means to detect the vibration of a vibration source or an optional point of the fuselage, and the servo valve is shifted preferably by electromagnetic nozzle means of the type which is shifted by said signal.

Although the present invention may be practiced in various modes, a preferred embodiment of the invention will be described hereunder with reference to the accompanying drawings.

Figure 1:
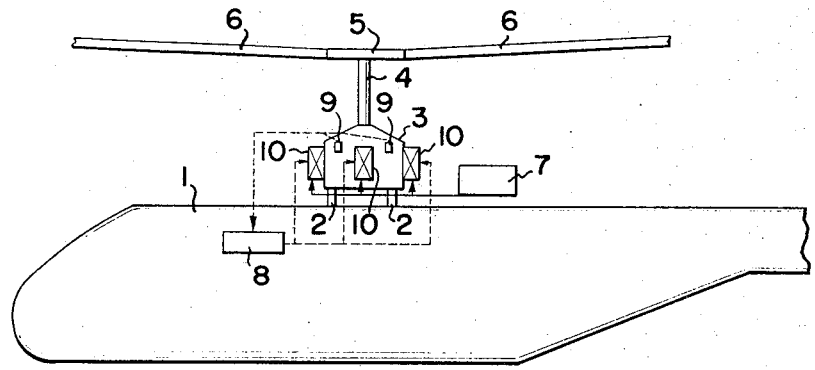
FIG. 1 is a schematic view exemplifying a helicopter to which the present invention is applied.
Figure 2:
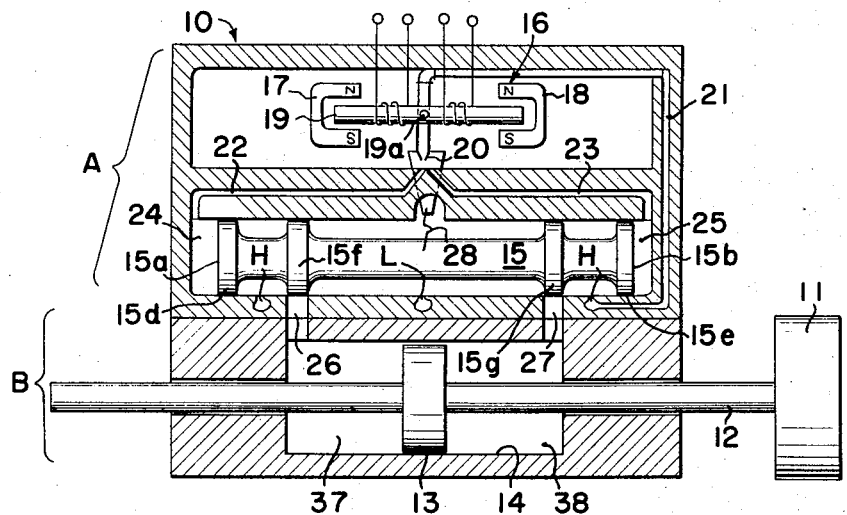
FIG. 2 is a diagrammatical sectional view briefly showing an embodiment of the vibration absorber according to the present invention.

Referring to FIG. 1, there is shown the device of the invention as applied to a helicopter to deal with the exciting forces from the rotor. This helicopter is so constructed that a transmission 3 mounted on the fuselage 1 by supporting means 2 drives the rotor 6 through a rotor mast 4 and a rotor head 5. In this embodiment, vibration absorbers 10 are mounted on the transmission 3, which receives a supply of high pressure oil from a hydraulic pump 7 under control of electrical means 8. By providing the vibration weights vibrating vertically at the longitudinally and transversely opposite sides of the transmission as shown, the three types of exciting forces, i.e., the vertical force, the pitching moment and the rolling moment, can be offset by the combination of vibratory phases of the respective weights. The electrical means 8 receives from vibration detectors 9, mounted on the transmission 3, information relating to vibrations, and compute corresponding control signals. In the present invention, the supply of hydraulic pressure to the vibration absorbers is controlled by the control signals from the electrical means 8. The practical construction of each vibration absorber is shown in FIG. 2 as an example.

The vibration absorber 10 consists of a servo valve portion A and a vibration weight portion B. The vibration weight portion B is composed of a vibration weight 11, a shaft 12 having one end connected to said vibration weight 11, a piston 13 fixedly mounted on the mid portion of said shaft 12, and a cylinder 14 in which said piston 13 is slidably disposed. The interior of the cylinder 14 is divided into a left side chamber 37 and a right side chamber 38 by the piston 13. The servo valve portion A includes a servo spool 15 and electromagnetic nozzle means 16 for supplying hydraulic pressure to control the movement of said servo spool. The electromagnetic nozzle means 16 includes a pair of fixed magnets 17, 18 and an electromagnet 19 interposed between said fixed magnets and pivotally mounted on a pin 19a. Coils are mounted around the electromagnet 19, which are connected to electrical means. Further, a nozzle 20 is fixed to the electromagnet 19, which is communicated with a passage 21 leading to a high pressure oil supply port H. The spool 15 has pressure receiving surfaces 15a, 15b at the opposite ends thereof and chambers 24, 25 on both sides of the spool are respectively communicated with one ends of passages 22, 23 the other ends of which are located adjacent the discharge opening of the nozzle 20. The spool 15 has lands 15d, 15e at the opposite ends and a pair of lands 15f, 15g between said lands 15d, 15e. When the spool 15 is in its neutral position, the lands 15f, 15g close communication holes 26, 27 between the cylinder 14 and the spool chamber, and the chamber between the lands 15d, 15f and the chamber between the lands 15g, 15e are communicated with the high pressure supply port H and the chamber between the lands 15f, 15g with a low pressure supply port L. Numeral 28 designates a servo spring by which the nozzle 20 and the spool 15 are connected with each other. In the arrangement described above, the high prssure oil supplied from the hydraulic pump through the port H is partially introduced into the nozzle 20 through the passage 21. On the other hand, a control signal from the electrical means is led to the coils around the electromagnet 19 to magnetize said electromagnet. The electromagnet 19 and the nozzle 20 make a pivotal movement around the pin 19a. When the nozzle 20 is in its neutral position, the hydraulic pressure is equally supplied into the passages 22, 23 and thus the spool 15 is maintained in its neutral position. Now, when the nozzle 20 is moved to the left, the pressure in the passage 22 becomes greater than the pressure in the passage 23, urging the spool 15 to move to the right. This rightward movement of the spool 15 is transmitted to the nozzle 20 through the spring 28, and said nozzle 20 is moved to the right and returned to its neutral position. When the spool 15 is displaced to the right in the manner described, the high pressure oil from the port H flows through the communication hole 26 into the left side chamber of the cylinder 14, causing the piston 13 to move to the right. Concurrently, the weight 11 is also moved to the right. The oil in the right side chamber 38 is discharged through the communication hole 27 and returned to the hydraulic pump from the port L. The amplitude and frequency of the vibration weight 11 can be set at the desired values by properly controlling the current supplied to the coils around the electromagnet 19. Although the vibration weights are mounted on the transmission 3 in the embodiment shown in FIG. 2, it will be obvious that they may be mounted on the rotor mast 4, the rotor head 5 or on the fuselage adjacent to the supporting system 2.

Figure 3:
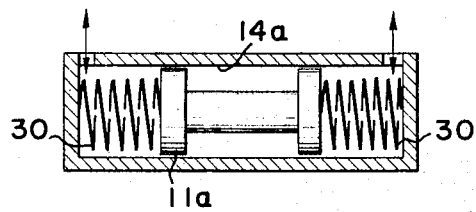
FIGS. 3 to 6 are diagrammatical sectional views showing various arrangements of the vibration weight portion.
Figure 4:
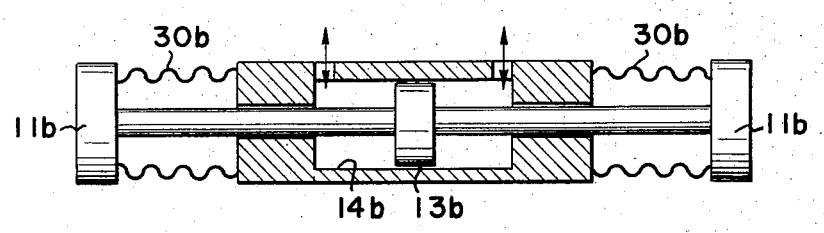
Figure 5:
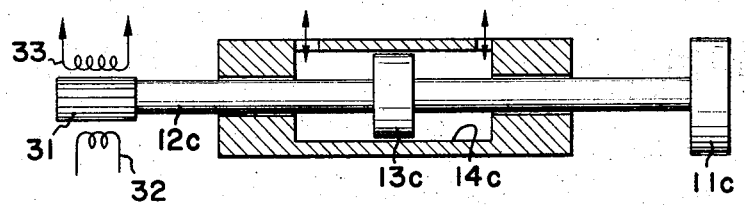

FIG. 3 shows a modification of the vibration weight portion. A vibration weight 11a in the shape of a free piston is disposed in a cylinder 14a and maintained in its neutral position by springs 30 bearing on both ends of said weight. This arrangement is advantageous in that, since there is provided means for positively maintaining the weight in its neutral position, the amplitude of the weight can constantly be maintained at the maximum value. FIG. 4 shows another modification of the vibration weight portion, in which pneumatic springs 30b are used for maintaining a piston 13b in its neutral position and vibration weights 11b are provided exteriorly of a cylinder 14b. FIG. 5 shows still another modification of the vibration weight portion, in which an iron core 31 is fixed to one end of a shaft 12c and a vibration weight 11c is controlled to maintain its neutral position by detecting the position of said iron core 31 by means of a primary coil 32 and a secondary coil 33.

Figure 6:
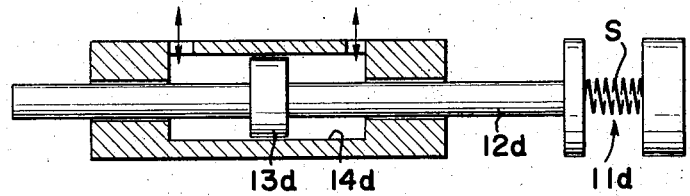

FIG. 6 shows a further modification in which a vibration weight 11d consists of two parts connected with each other by means of a spring s. This arrangement is advantageous in that the maximum amplitude can be obtained at a certain frequency.

Figure 7:
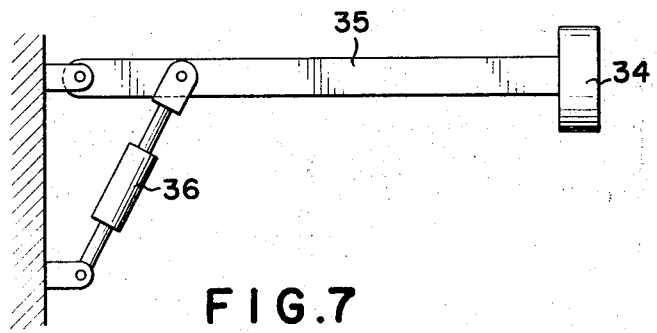
FIG. 7 is a view showing another arrangement of the vibration weight.

FIG. 7 shows a further arrangement in which a vibration weight 34 is mounted on one end of a pivoted lever 35 and the pivotal movement of said lever is controlled by a double-acting cylinder 36.

Figure 8:
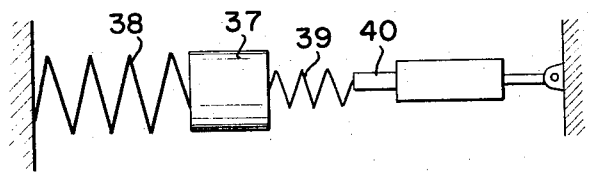
FIGS. 8 and 9 are views showing still other arrangements of the vibration weight respectively.
Figure 9:
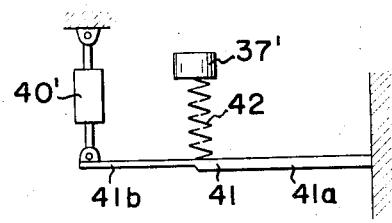

In the actual design, the amplitude and exciting force which can be generated by the hydraulic means are frequently subjected to large limitations, and in such a case, the vibration absorber may be constructed as shown in FIG. 8 or 9. Namely, in the construction shown in FIG. 8 a vibration weight is supported mainly by a main spring 38 and hydraulic means 40 excites through an auxiliary spring 39. In the construction shown in FIG. 9, the root portion 41a of a spring lever 41 and a spring 42 constitute a main spring and the front end portion 41b of the lever 41 constitute an auxiliary lever. Further, the natural frequency of the entire system, when the piston of the hydraulic means is considered as immovable, is mad equal to the frequency of the exciting force from the rotor. In this case, the amplitude of the exciting force of the hydraulic means can be extremely small and the exciting force can also be a fraction of the inertia force of the vibration weight.

The above-described embodiment is intended for the absorption of vibrations caused by the exciting forces from the rotor. In case of a compound helicopter having a main wing, however, vibrations of the main wing becomes a problem since the force of air blow from the rotor varies periodically. Such vibrations of the main wing can of course be absorbed by mounting the vibration weight of the type described above on the main wing.

In the dynamic vibration absorber of the invention, the amplitude of the vibration weight can be made large and the frequency thereof can be set at an optional value. It is to be understood that the present invention is not restricted to the details of the construction described herein but many modifications are possible. For example, an electromagnetic exciting device may be substituted for the hydraulic piston-cylinder. It is also to be understood that the electric signals to the servo valve are not necessarily restricted only to the inputs from the detectors but may be a combination of such inputs and an input from a manually operated element, a signal representative of the position of the control stick, a signal from a speedometer and a input from a static accelerometer.

I claim:

1. For use in rotary wing vehicles having rotors and means driving said rotors, a vibration absorbing apparatus, comprising:

a structural member through which exciting forces are transmitted to the fuselage of said rotary wing vehicle;

means coupling said structural member to said vehicle;

a vibration weight;

means coupling said vibration weight to said structural member in a position and direction of vibration to offset a selected one of a plurality of said exciting forces by the inertia of said vibration weight, said vibration weight coupling means including a resilient member interposed between and coupled to said vibration weight and said structural member;

driving means coupled to said structural member for imparting vibrations to said vibration weight through said structural member and said resilient member; and control means for controlling said driving means to control the vibrations imparted to said vibration weight.

2. The vibration absorbing apparatus according to claim 1, wherein said structural member comprises a spring lever having one end portion fixedly coupled to a housing of said vehicle and an opposite end portion coupled to said vibration weight driving means; and wherein said vibration weight is coupled through said interposed resilient member to an intermediate portion of said spring lever.

3. The vibration absorbing apparatus according to claim 1, wherein said structural member comprises a lever coupled to a housing of said vehicle; said vibration weight driving means being coupled to said lever, and said vibration weight being coupled to said lever through said interposed resilient member.

* * * * *